Jan. 7, 1958
F. G. ELY ET AL
2,819,150
METHOD OF RECOVERING CHEMICALS FROM THE
RESIDUAL LIQUOR PRODUCED IN THE PULPING
OF CELLULOSIC MATERIALS
Filed Nov. 5, 1954
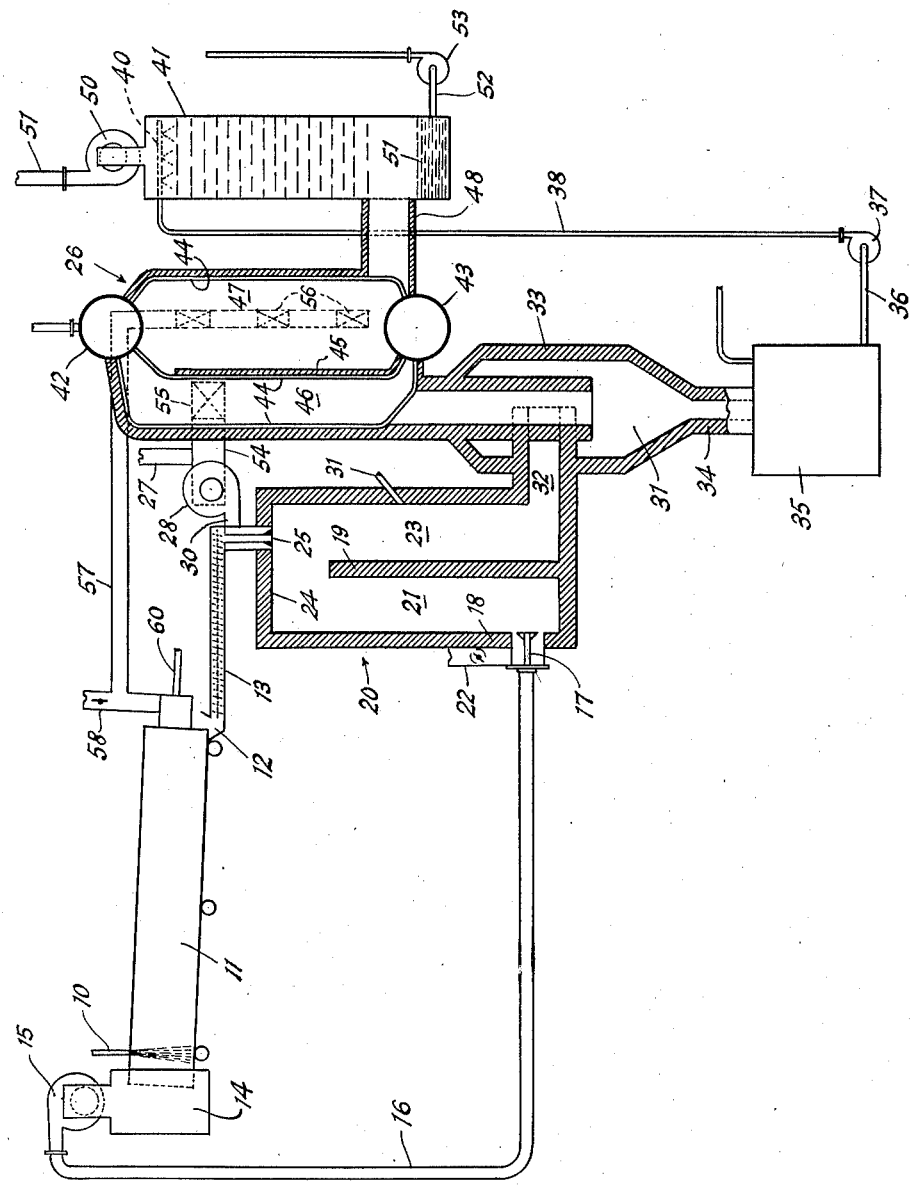
INVENTORS
*Frederic G. Ely*
*Charles E. Rogers*
*John B. Romer*
BY
*J. P. Moran*
ATTORNEY United States Patent Office 2,819,150
Patented Jan. 7, 1958

2,819,150

METHOD OF RECOVERING CHEMICALS FROM THE RESIDUAL LIQUOR PRODUCED IN THE PULPING OF CELLULOSIC MATERIALS

Frederic G. Ely, Paris, Charles E. Rogers, Alliance, and John B. Romer, Akron, Ohio, assignors to The Babcock & Wilcox Company, New York, N. Y., a corporation of New Jersey Application November 5, 1954, Serial No. 466,998

7 Claims. (Cl. 23—131)

The present invention relates to a method of and apparatus for the recovery of chemicals and heat from the residual liquor obtained from the pulping of cellulosic materials by the sulphite pulping process. More particularly, the present invention relates to a method for recovering the chemicals used in the calcium bisulphite pulping process.

In the pulp industry, utilizing wood as a source of cellulosic materials, wood chips are treated under selected temperature and pressure conditions in the presence of the cooking liquor to separate usable fibers from the wood and to form a pulp. The cooking liquors commonly in use in the industry are composed of acid or alkaline materials depending, to a large extent, upon the type of pulp required.

During the past several years the recovery of both chemicals and heat from the residual liquor obtained in the soda and sulphate processes of pulp production has attained a high degree of success. In these processes, the organic matter in the residual liquor has been burned under self-sustaining combustion conditions with the usable chemicals in the liquor obtained in the form of a smelt.

When magnesium bisulphite has been used as a base for the cooking liquor, the magnesium and sulphur are recoverable after incineration of the residual liquor so that the chemicals can be recombined to form the cooking liquor.

Heretofore, when calcium-base cooking liquors have been used, as for example, when using calcium bisulphite liquor, chemical recovery has not been entirely successful. When the residual liquor from a calcium-base sulphite process has been incinerated, the chemicals are apt to combine in the form of calcium sulphate and is consequently not usable in the pulping process. It has been the practice to allow the residual liquor from this process to go to a sewer or to be discharged into a body of water. This has caused a serious public nuisance, as well as a considerable loss of valuable chemicals.

On a laboratory basis, it has been fairly well established that chemicals, contained in the residual liquor from the calcium bisulphite cooking process, can be recovered. This is accomplished by treating the residual liquor by heating to a decomposition temperature of from 932° F. to 1,562° F., in the presence of carbon. This produces a reaction according to the formula $CaSO_4 + 4C = CaS + 4CO$. Unfortunately, when the product of this reaction is exposed to temperatures in the range of 1,562 to 1,832° F., the calcium sulphide (CaS) combines with $SO_2$ to form calcium sulphate and sulphur according to the formula $CaS + 2SO_2 = CaSO_4 + 2S$. However, if the calcium sulphide (CaS) is raised to a temperature of from 1832 to 2732° F., the calcium sulphide will combine with sulphur dioxide to form calcium oxide and sulphur, according to the formula $2CaS + SO_2 = 2CaO + 3S$.

We have found that the calcium sulphide in the residual liquor obtained from a calcium bisulphite cooking liquor can be converted to usable forms so that the chemicals can be recovered and reused in forming a cooking liquor. This is accomplished by subjecting the residual liquor to a dehydrating action in the presence of carbon at a temperature of not over 1562° F. in a reducing atmosphere. This action can be expressed by the formula $CaSO_4 + 4C = CaS + 4CO$. Thereafter, the calcium sulphide is separated from the gaseous carbon monoxide, the carbon monoxide is burned with sufficient oxygen to form carbon dioxide and to increase the temperatures of the gas to the range of 1832 to 2732° F. The CaS is then reintroduced into the high temperature gases with the addition of sulphur dioxide so that the reaction is $2CaS + SO_2 = 2CaO + 3S$. The sulphur in the gases is then converted to sulphur dioxide by the addition of oxygen.

At these temperatures, there is little likelihood of the formation of calcium sulphate. Before the mixture of high temperature gases and suspended solids is cooled below, say 1850° F., it is desirable to separate the CaO so that the CaO is not reconverted to calcium sulphate in the temperature range of 1562° F. to 1832° F., in the presence of $SO_2$. Accordingly, the hot gases with entrained solids are passed through a separator before the gases are passed through the heat exchange surfaces of, for example, a vapor generator. The separated solids containing CaO are mixed with water to form calcium hydroxide. When the gases have been cooled to a temperature below 1500° F., they are recombined with the calcium hydroxide in a spray contact tower to reform the cooking liquor as calcium bisulphite.

The various features of novelty which characterize our invention are pointed out with particularity in the claims annexed to and forming a part of this specification. For a better understanding of the invention, its operating advantages and specific objects attained by its use, reference should be had to the accompanying drawing and descriptive matter in which we have illustrated and described a preferred embodiment of the invention.

The drawing is a schematic elevation, partly in section, of apparatus for carrying out the method of the present invention.

As shown in the drawing, partially concentrated residual liquor from a calcium bisulphite pulping process is delivered through a pipe 10 to a retort 11. The liquor is preferably concentrated to a solids content of 50% or more in multiple effect evaporators (not shown). The retort 11 illustrated is of the rotating type with the liquor delivered to the upper end thereof and subjected to a temperature between 1,000 and 1,500° F. to remove the remaining moisture in the liquor and to dissociate the calcium sulphate in the liquor solids to calcium sulphide and to release carbon monoxide.

The heat necessary for the dehydration and treatment of the liquor is provided by waste gases as hereinafter described, and supplemented when necessary by an auxiliary fuel. The auxiliary fuel may be liquid, gaseous, or solid and the retort is operated under reducing atmosphere conditions so that the reaction occurring in the retort follows the formula: $CaSO_4 + 4C = CaS + 4CO$.

It is essential that reducing atmosphere conditions and temperatures not exceeding 1562° F. should be maintained in the retort 11 to dissociate the calcium sulphate. The solids gravitate downwardly through the retort 11 to discharge into a closed bin 12 from which they are removed by a screw feeder 13. The gases discharge from the upper end of the retort into a collecting chamber 14 from which they are withdrawn by an induced draft fan 15 discharging through a conduit 16 into a burner 17 positioned in the lower portion of a wall 18 of a refractory furnace 20.

As shown in the drawing, the burner 17 is located at the lower end of a gas up-pass 21, which is defined on one side by a division wall 19 extended upwardly from the bottom of the furnace 20 to a position space from the roof 24 of the furnace. The carbon monoxide gases delivered to the burner 17 are mixed with a controlled quantity of combustion air admitted through valved duct 22 to convert the carbon monoxide to carbon dioxide and to increase the gas temperatures in the up-pass 21 of the furnace 20. The combustion gases leaving the up-pass 21 enter a down-pass 23 in the furnace at a temperature in excess of 1850° F.

The calcium sulphide solids and ash discharging through the screw conveyor 13 are admitted to a burner 25 positioned in the roof 24 of the furnace 20 and in vertical alignment with the down-pass 23 of the furnace. The solids passing through the burner 25 are mixed with recirculated gases withdrawn from a heat exchange unit 26 (hereinafter described) by a fan 28 and discharged through a duct 30. These gases are high in $SO_2$ content, as hereinafter described, and may be supplemented by $SO_2$ gases separately generated and delivered under pressure to a duct 27 leading to the burner 25. The supplementary $SO_2$ gases may be generated in a conventional sulphur burner, or may be produced in any suitable manner.

The introduction of the mixture of dehydrated liquor solids and the $SO_2$ gases into the high temperature combustion products of the furnace converts the calcium sulphide to calcium oxide with the release of sulphur, according to the formula $CaS+SO_2=2CaO+3S$.

With the solids subjected to temperatures in excess of 1832° F., the calcium oxide is in a stable condition even though associated with sulphur. The sulphur passing through the down-pass 23 of the furnace is supplied with oxygen through a pipe 31 to convert the sulphur to $SO_2$.

The gaseous products with entrained calcium oxide leaving the furnace 20 through an outlet duct 32 at the bottom of the down-pass 23 are passed tangentially into a cyclone separator 33 which is constructed of refractory materials to withstand the temperatures involved. The separator removes the entrained solids from the carrier gas, with the solids discharging through a bottom outlet 34 into a mixing tank 35. Within the tank the calcium oxide is combined with water to form a calcium slurry, commonly known as milk-of-lime. The calcium slurry is removed from the mixing tank 35 through a pipe 36 to a pump 37 which discharges through an outlet pipe 38 into a series of spray nozzles 40 in the upper end portion of a mixing tower 41.

The gases leaving the cyclone separator 33 are generally free of entrained solids, and are passed through the heat exchanger 26 for the production of a vapor, such as steam, and to cool the gases.

The heat exchanger 26 illustrated in the drawing is a conventional two-drum steam boiler having upper and lower drums 42 and 43, respectively, connected by vapor generating tubes 44 and suitable downcomers (not shown). The vapor generating tubes 44 are formed, and provided with suitable refractory baffle 45 and an exterior housing to define upright flow passageways 46 and 47 for the series flow of gases therethrough.

The gases leaving the cyclone separator 33 enter the boiler from the bottom, with the hot gases passing upwardly through the passageway 46 and downwardly through the passageway 47 to discharge through a conduit 48 at the lower end of the boiler. Leaving the boiler, the gases discharge into the lower portion of the contact tower 41 where they contact the sprays of calcium suspension.

The contact between the milk-of-lime sprays and the cooled gases is counter-current; the gases discharging from the upper end of the tower 41 through an induced draft fan 50 and being discharged to the atmosphere through a stack 51. The lower end of the tower is provided with a sump 51 to collect the liquor which has been converted to calcium bisulphite in the tower. The calcium bisulphite liquor is drawn from the sump through a pipe 52 leading to the suction side of a pump 53 which discharges to suitable collecting tanks (not shown) for storage of the calcium bisulphite cooking liquor.

The gases entering the passageway 46 of the boiler contain a high percentage of $SO_2$ gas which is withdrawn, in part, from an opening 55 and through a duct 54 leading to the fan 28.

The remaining gases entering the passageway 47 also contain some $SO_2$ as well as inert gases, such as nitrogen and carbon dioxide, are further cooled in passing through the boiler or heat exchanger 26 and are withdrawn, in part, from the passageway 47 through openings 56 and a duct 57 for discharge to the retort 11.

The recirculated gases passing through the duct 57 are mixed with a controlled amount of air, admitted through the duct 58, before the mixture is delivered to the retort. Since it is desirable to maintain the retort 11 at a high temperature (not exceeding about 1550° F.), it is sometimes necessary to add auxiliary fuel to the retort. This fuel is introduced through a pipe 60 so that proper temperatures can be maintained. The auxiliary fuel is further useful in providing carbon for the reduction occurring in the retort under the reducing atmosphere heating and dehydrating conditions.

While in accordance with the provisions of the statutes, there has been illustrated and described herein a preferred embodiment of the invention, those skilled in the art will understand that changes may be made in the form of the apparatus disclosed, without departing from the spirit of the invention covered by our claims, and certain features of the invention may sometimes be used to advantage without a corresponding use of other features.

We claim:

1. The method of recovering chemicals from the residual liquor produced in the pulping of cellulosic materials by the calcium bi-sulphite pulp process comprising evaporating the water from the residual liquor in a heating zone to produce substantially dry solids under reducing conditions in the presence of carbon and at a temperature below 1560° F., introducing hot gases containing sulphur dioxide and a supplementary fuel to provide heat for said heating zone, separately withdrawing the gaseous product containing CO and the solid residue containing calcium sulphide from said heating zone; burning said gaseous product to convert the CO therein to $CO_2$ and to raise the temperature of the resulting combustion gases to a temperature above 2000° F., mixing the solid residue with $SO_2$ gases and said hot combustion gases to convert the calcium sulphide to calcium oxide and gaseous sulphur dioxide, separating the gases from the solids, mixing said solids with water to form calcium hydroxide, cooling said gases to an exit temperature below 1560° F. in a cooling zone, extracting gases from said cooling zone for delivery to said heating zone and contacting said calcium hydroxide with said cooled gases containing sulphur dioxide to produce a calcium bisulphite cooking acid for reuse in the pulping process.

2. The method of recovering chemicals from residual liquor that is produced in the pulping of cellulosic materials with a calcium sulphite cooking liquor comprising evaporating the water from the residual liquor to produce substantially dry solids, subjecting the substantially dry solids to a preliminary treatment zone at a temperature of between 1000 and 1560° F. under reducing conditions to produce gaseous products containing carbon monoxide and a solid product containing sulphur, burning the gaseous products in a separate combustion zone to produce a gaseous product containing $CO_2$ at an exit temperature of from 1830 to 2730° F., mixing $SO_2$ gas and the sulphur containing solid from said preliminary treatment zone with said $CO_2$ containing gases to produce as reaction products a calcium oxide and sulphur, admitting oxygen to said reaction products to convert said sulphur to sulphur dioxide, separating the solid and gaseous reaction products, converting the solid calcium oxide separated from said reaction products to a calcium hydroxide by mixing with water, removing a portion of the separated gaseous products of said reaction for introduction into said combustion zone to provide said $SO_2$ gas, cooling the remaining portion of the separated gaseous products from said reaction by passing over heat absorbing surfaces, and contacting said cooled gaseous products with said calcium hydroxide to absorb the $SO_2$ and form a calcium sulphite cooking liquor.

3. The method of recovering chemicals from residual liquor that is produced in the pulping of cellulosic materials with calcium bi-sulphite cooking liquor comprising evaporating the water from the residual liquor to produce substantially dry solids and subjecting the substantially dry solids to a preliminary treatment zone at a temperature of between 1000 and 1560° F. under reducing conditions in the presence of carbon to produce gaseous products containing carbon monoxide and a solid product containing calcium sulphide, burning the gaseous products in a separate combustion zone to produce a gaseous product containing $CO_2$ at an exit temperature of from 1830 to 2730° F., mixing $SO_2$ gas and the calcium sulphide containing solid from said preliminary treatment zone with said $CO_2$ containing gases to produce as reaction products a calcium oxide and sulphur, admitting oxygen to said reaction products to convert said sulphur to sulphur dioxide, separating the solid and gaseous reaction products, converting the calcium oxide separated from said gaseous reaction products to a metal hydroxide by mixing with water, cooling said gaseous products from said reaction to generate steam, removing a portion of the separated gaseous products of said reaction for introduction into said combustion zone to provide said $SO_2$ gas, further cooling the remaining portion of the separated gaseous products from said reaction by passing over heat absorbing surfaces, removing a portion of said further cooled gaseous products for introduction into said preliminary treatment zone, and contacting the remaining further cooled gaseous products with said metal hydroxide to absorb the $SO_2$ and form a calcium bi-sulphite cooking liquor.

4. The method of recovering chemicals from the residual liquor produced in the pulping of cellulosic materials with calcium bisulphite cooking liquor comprising passing the residual liquor through a dehydrating zone under reducing conditions at a temperature below 1560° F. and in the presence of carbon; separately withdrawing the gaseous product containing CO and the solid residue containing calcium sulphide from said zone; burning the gaseous product to convert the CO to $CO_2$ and to raise the temperature of the gases to a temperature of at least 2000° F.; mixing the solid residue with $SO_2$ gases and said hot $CO_2$ gases to convert the solid residue to calcium oxide and sulphur dioxide; separating the gases from the solids; mixing said solids with water to form a calcium hydroxide; and contacting said hydroxide with the gases to produce calcium bisulphite cooking liquor for reuse in the pulping process.

5. The method of recovering chemicals from the residual liquor produced in the pulping of cellulosic materials with calcium bisulphite cooking liquor comprising concentrating the residual liquor through a dehydrating zone under reducing conditions in the presence of carbon and at a temperature below 1560° F.; separately withdrawing the gaseous product containing CO and the solid residue containing calcium sulphide from said dehydrating zone; burning the gaseous product to convert the CO to $CO_2$ and to raise the temperature of the gases to a temperature of at least 2000° F.; mixing the solid residue with $SO_2$ gases and said hot gases to convert said solid residue to calcium oxide and sulphur; adding oxygen to convert said sulphur to sulphur dioxide; separating the gases from the hot solids; mixing said solids with water to form a calcium hydroxide; and contacting said hydroxide with the gases to produce a calcium bisulphite cooking acid for reuse in the pulping process.

6. The method of recovering chemicals from the residual liquor produced in the pulping of cellulosic materials by the calcium bisulphite pulp process comprising concentrating the residual liquor; passing the concentrated liquor through a heating zone under reducing conditions in the presence of carbon and at a temperature below 1560° F., separately withdrawing the gaseous product containing CO and the solid residue containing calcium sulphide; burning the gaseous product to convert the CO to $CO_2$ and to raise the temperature of the gases to a temperature above 2000° F.; mixing the solid residue with $SO_2$ gases and said hot gases to convert the solid residue to calcium oxide and sulphur; adding oxygen to convert said sulphur to sulphur dioxide; separating the gases from the solids; passing said gases through a gas cooling zone; mixing said solids with water to form calcium hydroxide; and contacting said hydroxide with the cooled gases to produce calcium bisulphite cooking acid for reuse in the pulping process.

7. The method of recovering chemicals from the residual liquor produced in the pulping of cellulosic materials with calcium sulphite cooking liquor comprising passing residual liquor through a heating zone under reducing conditions in the presence of carbon and a temperature below 1560° F.; separately withdrawing the gaseous product containing CO and the solid residue containing calcium sulphide from said preliminary heating zone; burning the gaseous product to convert the CO to $CO_2$ and to raise the temperature of the gases to a temperature of at least 2000° F.; mixing the solid residue with $SO_2$ gases and said hot $CO_2$ gases in a conversion zone to convert the calcium sulphide to calcium oxide and sulphur; adding oxygen to said gases to convert the said sulphur to sulphur dioxide; cooling said sulphur dioxide containing gases; diverting a portion of said cooled sulphur dioxide containing gases to said conversion zone; separating the gases from the solids; mixing the solids with water to form calcium hydroxide; and contacting said calcium hydroxide with the remaining portion of said cooled gases containing sulphur dioxide to produce calcium sulphite cooking acid for reuse in the pulping process.

References Cited in the file of this patent

UNITED STATES PATENTS

| 1,077,243 | DeCew | Oct. 28, 1913 |
|---|---|---|
| 1,303,314 | Hinzke | May 13, 1919 |
| 2,188,321 | Swanson et al. | Jan. 30, 1940 |
| 2,238,456 | Tomlinson | Apr. 15, 1941 |
| 2,285,876 | Tomlinson | June 9, 1942 |
| 2,340,154 | Stone et al. | Jan. 25, 1944 |
| 2,377,282 | Tomlinson | May 29, 1945 |
| 2,583,145 | Hochmuth | Jan. 22, 1952 |
| 2,696,424 | Schoeffel | Dec. 7, 1954 |